Aug. 28, 1934.  J. T. BALDWIN  1,971,636
OIL GEL COMPOSITION AND PROCESS OF PRODUCING THE SAME
Filed March 8, 1932
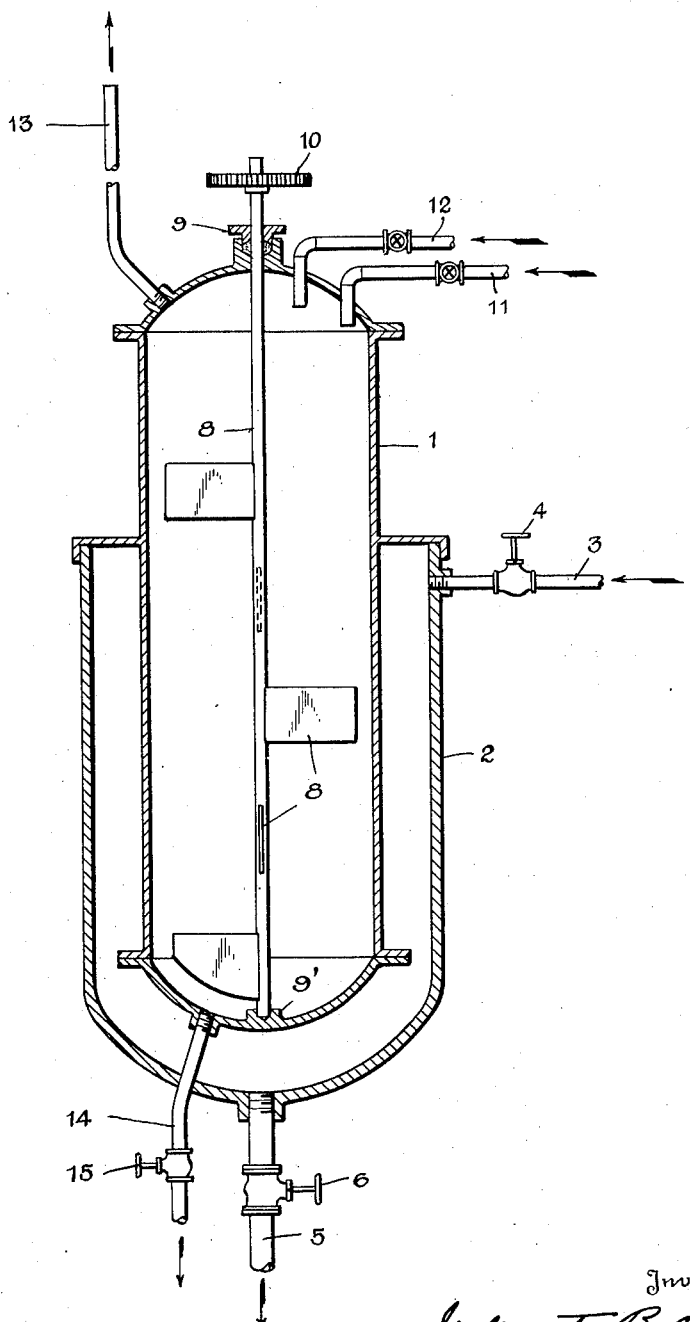

Patented Aug. 28, 1934

1,971,636

UNITED STATES PATENT OFFICE 1,971,636

OIL GEL COMPOSITION AND PROCESS OF PRODUCING THE SAME

Julian T. Baldwin, West Chester, Pa.

Application March 8, 1932, Serial No. 597,611

13 Claims. (Cl. 134—79)

This invention relates to materials for coating compositions, and to new products and the procedure for making them. More particularly it relates to the incorporation of materials in a dispersion of oil gel and dispersing medium to produce a mutual dispersion, and to making various coatings, plastic compositions and cements therefrom.

When linseed oil or other drying oils dry they form a solid elastic mass which is called a gel. This gel is considered insoluble. Parts of it may be extracted with powerful solvents, the amount capable of being extracted depending on the degree of hardening or oxidation of the oil, highly oxidized oil gels having less extractible matter than those only partially oxidized.

Oxidized "scrim oil" used in linoleum manufacture has only a portion of its matter extractible with powerful solvents, and one of the control tests applied thereon consists in extracting the "scrim oil" in a refluxing apparatus for three days with toluol and with petroleum ether. For example, a good "scrim oil" containing 40% matter extractible with toluol and 20% extractible with petroleum ether, has 60% and 80% of its matter insoluble after this drastic treatment. This latter portion is referred to as the insoluble part and has apparently not been dissolved.

The oxidized oil, however, if it could be made to completely dissolve, could be made into a solution or dispersion suitable as a vehicle for paints, and such paints would dry by evaporation, largely, since the oil would be already oxidized. The paint could then be first dried under scientifically controlled conditions, then applied to the surface to be painted.

It has been discovered that the problem of dissolving or dispersing the so-called insoluble oil gels can be solved by subjecting the gel to pressure in the presence of a dispersing agent or medium. The pressure may be mechanical or vapor pressure. The pressure, if mechanical, may be applied by passing a mixture of the gel and dispersing agent through a pair, or a plurality of pairs, of grinding rolls as they are known in the linoleum industry. A number of passes through the rolls are requisite for securing the thorough dispersion of the gel. The finest dispersions of the gel are obtained by the use of vapor pressure, although the gel may be subjected first to mechanical pressure, then to vapor pressure, then again to mechanical pressure, so that the gel is subjected to mechanical pressure both before and after the vapor pressure treatment.

When vapor pressure is used the procedure is as follows: 700 grams of scrim oil that is ground, and 1500 grams of ethyl alcohol-toluol mixture (equal parts of each solvent) are placed in an aluminuium, tantalum, or acid resisting alloy lined autoclave which is then closed. Heat is applied so that the temperature of the autoclave is maintained from 205° F. to 220° F. or at such a temperature that a pressure of 15 lbs. per square inch is created within the autoclave. This is maintained for 70 hours. At the end of this time the average scrim oil will be dispersed in the solvent.

This dispersing process is set forth more in detail in my copending application Serial No. 497,947.

Other dispersing mediums than mixtures of ethyl alcohol and toluol may be used, for example: ethyl alcohol, toluol, Ansol P. R. (anhydrous 50—50 ethyl acetate-ethyl alcohol), ethyl acetate, ethyl alcohol, ether, benzol, acetone, etc. Petroleum fractions distilling from 150° F. to 220° F. are satisfactory in the case of soft oil gels.

Other gels besides those which are secured primarily by oxidation may be dispersed by this treatment. Thus oils, including non-drying oils, gelled by sulfur or sulfur chloride may be dispersed by this treatment. China-wood oil gelled by ferric chloride or by heat treatment may be dispersed.

The present invention is concerned likewise with the dispersion of oil gels, particularly those of the oxidized oil variety, in the manner described hereinbefore and in my copending application Serial No. 497,949 and with the further feature of adding a material to the dispersion so that the oil gel and added material are placed in mutual dispersion with the dispersing medium, and in making various coatings, plastic compositions and cements therefrom.

The present day linoleum cement must contain a resin and rosin is used almost exclusively, since rosin is the only resin with the fluxing properties which are necessary in order to dissolve or melt the oxidized oil so that a homogeneous linoleum cement is formed. Rosin may be considered a high boiling point solvent. Rosin, however, is very readily attacked by alkalies. In the process hereinafter described, the oil gel is dispersed in volatile dispersing agents in place of being dissolved in rosin, so that in this way the oil and alkali-resistant resins can be made into a homogeneous plastic without having the rosin present. Due to the introduction of many new powerful soaps and cleaners on the market, alkali resistance is becoming of increasing importance in floor coverings.

The improved process employed herein may be divided into two steps, dispersion and evaporation. In the practice of the first step of the improved process as carried out in accordance with the present invention, an oil gel, preferably of the oxidized variety, is dispersed with suitable volatile dispersing agents under pressure, in the hereinbefore described manner, and then a phenol-formaldehyde, cumaron, vinyl chloracetate, or other alkali-resistant resin is added to the dispersion, in order to be placed thereby in mutual dispersion with the oil gel and dispersing agent.

The procedure in connection with the second step of the improved process presents an option between two methods which may be employed. The dispersion may either be heated to such a temperature that the volatile dispersing agent will be distilled off, or it may be sprayed onto linoleum composition in its liquid form, so that the dispersing agent will be volatilized in the further steps of the process of linoleum manufacture, particularly in the passage of the linoleum composition between steam-heated rolls. If the first optional procedure is employed, the resultant product will be linoleum cement in a form ready for use in the usual process of linoleum manufacture, while if the second procedure is employed, the linoleum cement will be formed in the subsequent steps of the linoleum process and used as fast as formed.

Resin-tung oil reaction products may also be used in place of resin alone, provided such reaction products fulfill the requirement of being resistant to the action of alkalies.

In a specific embodiment of the process as carried out in accordance with the present invention, from two to four parts of phenol-formaldehyde or other alkali-resistant resin are added to ten parts of oxidized oil gel in the form of a dispersion created by subjecting a mixture of oxidized oil gel and volatile dispersing agent in a pressure reaction vessel to a vapor pressure of four atmospheres. After complete mutual dispersion the dispersing agent is removed by either the first or second optional procedure.

Analogous to the incorporation of resins in dispersions of oxidized gels in dispersion mediums is the incorporation of cellulose esters in like dispersions. Nitrocellulose, alone or mixed in lacquers or combined in celluloid waste, films or the like, can be combined with dispersions of oxidized oil gels in any dispersing medium capable of dissolving the nitrocellulose, and with the aid of pigments and filling materials such articles as floor cloth, artificial leather, nitrocellulose varnishes, nitrocellulose paints and groundings, glutinants, impregnating materials, dressings, adhesives, wall coverings, roofing material, etc, can be manufactured.

In practice, the improved process as carried out in accordance with the present invention, an oil gel preferably of the oxidized drying oil variety such as linoxyn or scrim oil is dispersed by means of heat and pressure as hereinbefore described and described in detail in my copending application, Serial No. 497,947, with a volatile liquid dispersing medium capable of dissolving the added material. Then the cellulose ester or other material is added to the dispersion thereby producing a mutual dispersion with the oil gel and dispersing medium.

Pigments and filling materials may then be added to the dispersion and the mixture sprayed or flowed onto a backing and the dispersing medium evaporated. These dispersions have been found particularly useful as lacquers for linoleum floor coverings but it is apparent that they may be used in various other ways.

Resins and plasticizers may also be added to the dispersion of nitrocellulose and oil gel.

Other materials than cellulose esters (nitrocellulose and the like) may be used. Vinyl esters, caoutchouc and any other material which will dissolve in a solution or dispersion of oil gel preferably dispersed by applicant's process may be used.

As a specific embodiment of the process as carried out in accordance with the present invention from 1 part to 20 parts of lacquer (22% solids, 60% solids as nitrocellulose, 40% castor oil) were mixed with 10 parts of a 30% solution of scrim oil in Ansol P. R. (anhydrous 50—50 ethyl acetate-ethyl alcohol) in the form of a dispersion created by subjecting a mixture of scrim oil and Ansol P. R. in a pressure reaction vessel to a temperature of around 250° F. After complete mutual dispersion pigments such as lithopone may be added.

In place of scrim oil linoleum cement (scrim oil 3 parts, rosin 1 part) may be substituted and mixed with the nitrocellulose lacquer as described above. This produces a much more flexible lacquer than if rosin were added alone to nitrocellulose lacquer.

It is also evident that a cellulose ester may be incorporated in like manner with the alkali-resistant resin cement.

The process of evaporation of the dispersing medium and drying of the residue as described hereinbefore has been at ordinary temperatures. Evaporation and drying at high temperatures as 120° to 150° F. gives an improved product which is tough, infusible and insoluble.

A specific example of a highly alkali-resistant linoleum binding agent made by the above high temperature is: Scrim oil made of China-wood oil is dispersed with solvents under pressure in an acid-resistant autoclave. The addition of an active phenol-formaldehyde resin is made to the China-wood oil gel before it is dispersed (the resin and oil are put together in the autoclave). The solvents are evaporated from the dispersion and the oil-resin mixture is heat treated at 350° F. to 400° F. until a body suitable for linoleum cement is obtained. Ten parts of oil to two of resin may be taken.

It is important during the heat treatment to prevent the oil gel residues from being darkened by contact with the oxygen in the air, while they are at elevated temperatures. Carbon dioxide may be employed advantageously for this purpose.

The type of apparatus used in this heat treatment may best be understood by having reference to the accompanying drawing, in which: 1 represents an aluminum reaction vessel of a suitable size, which is generally about 54 inches high and 15 inches inside diameter, partially surrounded by a superheated steam or hot oil jacket 2, equipped with steam or hot oil supply pipe 3 having control valve 4 and steam or hot oil discharge pipe 5 having control valve 6. The reaction vessel is equipped with an agitator consisting of shaft 7 and blades 8, the shaft passing through a stuffing box 9 at the upper end of the reaction vessel and being driven through the agency of drive wheel 10 by a belt or other suitable connector from a source of power, not shown.

The reaction vessel is equipped with valved pipes 11 and 12 for the introduction of carbon dioxide and solvents, respectively, with a vertical aluminum pipe 13, about 12 feet long and ¾ inch inside diameter with its upper end open, comprising a reflux condenser, and with a residuum draw off pipe 14 provided with valve 15. Shaft 7 is supported at the bottom of vessel 1 by thrust bearing 9'.

A specific example of a treatment as carried out in the above apparatus is as follows. One hundred pounds of the residue left after evaporating or otherwise removing the solvents from an oil gel dispersion is placed in reaction vessel 1 and heating fluid admitted to jacket 2. This is in contrast to heating the vessel by direct fire, which would cause the walls of the vessel to become so undesirably hot that the oil residue would tend to be cracked or decomposed by the hot spots. The top of the vessel is enclosed and the reflux condenser 13 is air cooled. A slow stream of carbon dioxide gas is admitted through pipe 11 and the contents of the vessel are then heated to 420° F. in one-half hour. If the gel residue is derived from scrim oil, the residue will be transformed to insoluble, infusible form in less than one-half hour at that temperature. To secure the soluble, but infusible form, the temperature is held at 420° F. for from three to fifteen minutes, then five gallons of butanol are added slowly through pipe 12. The agitator is kept in motion from the start of the treatment. The solution produced may be reduced further with solvents according to the body desired. After cooling it is ready for use.

In this case, if the linoleum cement is to be used as is usual (not in solution) it is generally desirable to change the oil gel and resin mixture to the insoluble, infusible form with the heat treatment. This consists of applying heat to the residue left after the evaporation or removal of the dispersing agents or solvents. The heat reaction becomes very rapid at 460° F. and the gel is transformed to an infusible, insoluble solid when oxidized linseed or China-wood oils are used. The reaction is carried out at a low temperature such as 200° F. to avoid discoloration and decomposition. It is desired in most cases to stop the reaction before the insoluble, infusible state is reached. This may be done by cutting with solvent at the proper time. This treatment very greatly increases the resistance of the oil to alkalies or aqueous liquids. The length of time and the temperature required to form the insoluble, infusible form depend on the nature of the original oil. With highly oxidized linseed and China-wood oils the time required to make this form is from five to fifteen minutes at 420° F. At lower temperatures the time increases. Reactive agents as phenol or reactive antioxidants up to 5% by weight of the oil may be incorporated with the oil before this hardening process. The addition of resins during or before the cooking reduces the viscosity of the gel solutions in most cases. Glycerine may be added to esterify the free acids. Since this heat treatment eventually makes an insoluble, infusible form, it suggests the use of these dispersed oil gels as moulding plastics.

Throughout the specification and claims, the expression "pure oil gels" is to be understood as meaning oil gels formed by initial drying processes from pure drying oils, and containing no other ingredients than the oxidized or modified oil itself, thereby excluding any such gels as those formed from linoleum scrap or like materials containing water soluble materials, coloring matter or other impurities harmful in paints or varnishes.

Also, in the specification and claims the term "dispersion" is to be taken as including all liquid mixtures of carrier and secondary material wherein the two are so thoroughly intermingled as to make discrete particles of the secondary material invisible to the naked eye, thereby including true solutions as well as dispersions. The term "dispersing agent" is to be taken to mean a liquid carrier in the nature of either a solvent or a medium for holding colloid particles.

The term "oxidized oil gel" as used throughout the specification and claims, is to be understood to be equivalent to gels of oxidized aliphatic unsaturated fatty material.

What I claim is:

1. A process of producing a composition of matter which process comprises dispersing oil gel in a solvent, evaporating the solvent and heating the residue to form a solid, infusible product, dispersing the resulting product in a solvent, and mixing the resulting dispersion with a cellulose ester lacquer.

2. A compoistion comprising the oil gel and cellulose ester lacquer product of the process set forth in claim 1.

3. A process of producing a composition of matter which process comprises dispersing oxidized oil gel in solvent material selected from a group consisting of ethyl alcohol, toluol, ethyl acetate, ether, benzol, acetone and petroleum fractions, evaporating the solvent and heating the residue to form a solid, infusible product, dispersing the resulting product in a solvent, and mixing the resulting dispersion with a cellulose ester lacquer.

4. A process of producing a composition of matter which process comprises dispersing oxidized oil gel material in solvent material, evaporating the solvent and heating the residue to form a solid, infusible product, dispersing the resulting product in a solvent, and bringing together the resulting dispersion and cellulose derivative.

5. A composition comprising the oxidized oil gel and cellulose derivative product of the process of claim 4.

6. A process of producing a composition of matter which process comprises dispersing oxidized oil gel material in solvent material, evaporating the solvent and heating the residue to form a solid, infusible product, dispersing the resulting product in a solvent, and bringing together the resulting dispersion, cellulose ester and plasticizer material.

7. A composition comprising the oxidized oil gel, cellulose ester and plasticizer product of the process of claim 6.

8. A process of producing a composition of matter which process comprises dispersing oxidized oil gel material in solvent material, evaporating the solvent and heating the residue to form a solid, infusible product, dispersing the resulting product in a solvent, and bringing together the resulting dispersion, cellulose ester and resin material.

9. A composition comprising the oxidized oil gel, cellulose ester and resin product of the process of claim 8.

10. A process of producing a composition of matter which process comprises dispersing oxidized oil gel material in solvent material, evaporating the solvent and heating the residue to form a solid, infusible product, dispersing the resulting product in a solvent, and bringing together the resulting dispersion, cellulose ester, plasticizer and resin material.

11. A process of producing a composition of matter which process comprises dispersing oxidized oil gel material in solvent material, evaporating the solvent and heating the residue to form a solid, infusible product, dispersing the resulting product in a solvent, and bringing together the resulting dispersion, cellulose ester and rosin.

12. A process of producing a composition of matter which process comprises dispersing oil gel and resin in a dispersing medium, evaporating the dispersing medium and heating the residue to form a solid, infusible product, dispersing the resulting product in a dispersing medium, and bringing together the resulting dispersion and cellulose derivative.

13. A composition comprising the product of claim 12 including the heat treated oil gel and resin product and cellulose derivative.

JULIAN T. BALDWIN.